United States Patent
Yamazaki et al.

(10) Patent No.: US 11,643,159 B2
(45) Date of Patent: May 9, 2023

(54) ELECTRIC POWER GENERATOR FOR HUMAN-POWERED VEHICLE

(71) Applicant: Shimano Inc., Osaka (JP)

(72) Inventors: Azusa Yamazaki, Osaka (JP); Kenkichi Inoue, Osaka (JP); Yuuya Yoneda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/360,202

(22) Filed: Jun. 28, 2021

(65) Prior Publication Data
US 2022/0410999 A1  Dec. 29, 2022

(51) Int. Cl.
*B62J 6/12* (2006.01)
*H02K 21/22* (2006.01)
*H02K 21/24* (2006.01)
*H02K 7/14* (2006.01)

(52) U.S. Cl.
CPC .............. *B62J 6/12* (2013.01); *H02K 21/227* (2013.01); *H02K 21/24* (2013.01)

(58) Field of Classification Search
CPC ..................................... B62J 6/12; H02K 7/14
USPC ...................................................... 310/67 A
See application file for complete search history.

(56) References Cited

U.S. PATENT DOCUMENTS

| 3,519,860 | A | * | 7/1970 | Stone | ..................... H02K 3/522 |
| | | | | | 310/71 |
| 5,932,943 | A | * | 8/1999 | Werner | ....................... B62J 6/08 |
| | | | | | 310/67 A |
| 6,286,616 | B1 | * | 9/2001 | Kutter | ....................... B62M 6/40 |
| | | | | | 180/220 |
| 7,042,123 | B2 | | 5/2006 | Kitamura et al. | |
| 8,884,481 | B2 | | 11/2014 | Hasegawa | |
| 2008/0100183 | A1 | * | 5/2008 | Kitamura | ................... B62J 6/12 |
| | | | | | 310/67 A |
| 2018/0170099 | A1 | | 6/2018 | Yamazaki | |

FOREIGN PATENT DOCUMENTS

CN  1576154 A  * 2/2005  ................ B62J 6/12

* cited by examiner

*Primary Examiner* — Jose A Gonzalez Quinones
(74) *Attorney, Agent, or Firm* — Global IP Counselors, LLP

(57) ABSTRACT

An electric power generator is provided for a human-powered vehicle. The electric power generator includes an axle, a stator, a rotor and a first electrical cable. The axle has a first axial end, and a second axial end. The stator has a first axial stator-end that faces the first axial end of the axle with respect to the rotational center axis and a second axial stator-end that faces the second axial end of the axle with respect to the rotational center axis. The rotor is rotatably mounted on the axle to rotate around a rotational center axis of the electric power generator. The first electrical cable is electrically connected to the stator on the first axial stator-end of the stator. The first electrical cable extends axially through the stator toward the second axial stator-end of the stator with respect to the rotational center axis.

20 Claims, 14 Drawing Sheets

ELECTRIC POWER GENERATOR FOR HUMAN-POWERED VEHICLE

BACKGROUND

Technical Field

This disclosure generally relates to an electric power generator for a human-powered vehicle.

Background Information

Recently, electric power generators have been installed on human-powered vehicles (e.g., bicycle) as power sources for electric devices. Such electric power generators generate electricity in accordance with the rotation of a wheels of the human-powered vehicle. In some cases, these electric power generators have a magnet and a coil assembly. One of the magnet and the coil assembly rotates in accordance with the rotation of the wheel, while the other one of the magnet and the coil assembly is stationary. Sometimes an electric power generator is provided to a hub of the human-powered vehicle.

SUMMARY

Generally, the present disclosure is directed to various features of a hub assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an electric power generator is provided for a human-powered vehicle. The electric power generator includes an axle, a stator, a rotor and a first electrical cable. The axle has a first axial end, and a second axial end. The stator has a first axial stator-end that faces the first axial end of the axle with respect to the rotational center axis and a second axial stator-end that faces the second axial end of the axle with respect to the rotational center axis. The rotor is rotatably mounted on the axle to rotate around a rotational center axis of the electric power generator. The first electrical cable is electrically connected to the stator on the first axial stator-end of the stator. The first electrical cable extends axially through the stator toward the second axial stator-end of the stator with respect to the rotational center axis.

With the electric power generator according to the first aspect, excess deflection of the first electrical cable can be suppressed.

In accordance with a second aspect of the present disclosure, the electric power generator according to the first aspect is configured so that the rotor includes at least one magnet.

With the electric power generator according to the second aspect, it is possible to easily construct the rotor using at least one magnet.

In accordance with a third aspect of the present disclosure, the electric power generator according to the first or second aspect is configured so that the stator includes an armature disposed on the axle, and the first electrical cable extends axially through the armature.

With the electric power generator according to the third aspect, the first electrical cable can easily pass through the armature such that deflection of the first electrical cable is reduced.

In accordance with a fourth aspect of the present disclosure, the electric power generator according to the third aspect is configured so that the armature includes a winding coil and a bobbin. The first electrical cable extends axially through the armature at a point that is radially outward of the winding coil.

With the electric power generator according to the fourth aspect, the first electrical cable can be easily connected to the winding coil so as to reduce the deflection of the first electrical cable.

In accordance with a fifth aspect of the present disclosure, the electric power generator according to any one of the first aspect to the fourth aspect further comprises an electric circuit board. The first electrical cable is electrically connected to the electric circuit board.

With the electric power generator according to the fifth aspect, it is possible to regulate the electric power that is generated and to transmit the electric power to the electric circuit board.

In accordance with a sixth aspect of the present disclosure, the electric power generator according to the fifth aspect is configured so that the electric circuit board is disposed adjacent the stator at the second axial stator-end of the stator in the axial direction with respect to the rotational center axis.

With the electric power generator according to the sixth aspect, the length of the first electrical cable can minimized while suppressing the deflection of the first electrical cable.

In accordance with a seventh aspect of the present disclosure, the electric power generator according to the fifth aspect or the sixth aspect is configured so that the electric circuit board is disposed perpendicular to the rotational center axis. The electric circuit board has a first axially facing surface facing the stator and a second axially facing surface facing away from the stator.

With the electric power generator according to the seventh aspect, it is possible to increase the degree of freedom in arranging parts and facilitate compact arrangement of the electric circuit board.

In accordance with an eighth aspect of the present disclosure, the electric power generator according to the seventh aspect is configured so that the first electrical cable is electrically connected to the second axially facing surface of the electric circuit board.

With the electric power generator according to the eighth aspect, the first electrical cable can be easily connected to the electric circuit board.

In accordance with a ninth aspect of the present disclosure, the electric power generator according to any one of the fifth aspect to the eighth aspect further comprises a housing in which the electric circuit board is disposed.

With the electric power generator according to the ninth aspect, it is possible to more reliably protect the electric circuit board in the housing.

In accordance with a tenth aspect of the present disclosure, the electric power generator according to the ninth aspect is configured so that the housing is disposed adjacent to the stator at the second axial stator-end of the stator in the axial direction with respect to the rotational center axis.

With the electric power generator according to the tenth aspect, the stator and the housing can be provided in a relatively compact arrangement.

In accordance with an eleventh aspect of the present disclosure, the electric power generator according to the ninth aspect or the tenth aspect is configured so that the housing has a first surface facing the second axial stator-end of the stator. The first electrical cable extends from the first surface towards the stator.

With the electric power generator according to the eleventh aspect, the stator and the housing can be provided in a relatively compact arrangement.

In accordance with a twelfth aspect of the present disclosure, a hub assembly is provided that comprises the electric power generator according to any one of the fifth aspect to the eleventh aspect, and further comprises a hub body rotatably mounted on the axle to rotate around a rotational center axis of the electric power generator.

With the hub assembly according to the twelfth aspect, the electric power generator can be provided to a hub of the human-powered vehicle for generating electricity.

In accordance with a thirteenth aspect of the present disclosure, the hub assembly according to the twelfth aspect further comprises a second electrical cable electrically connected to the electric circuit board and extending out from the hub body.

With the hub assembly according to the thirteenth aspect, data and/or power can be provided to an electric component from the hub assembly via the second electrical cable.

In accordance with a fourteenth aspect of the present disclosure, the hub assembly according to the twelfth aspect or the thirteenth aspect further comprises at least one capacitor electrically connected to the electric circuit board.

With the hub assembly according to the fourteenth aspect, it is possible to provide power to the electric circuit board while the human-powered vehicle is stopped.

In accordance with a fifteenth aspect of the present disclosure, the hub assembly according to any one of the twelfth aspect to the fourteenth aspect further comprises a sprocket support structure rotatably disposed around the rotational center axis to transmit a driving force to the hub body while rotating in a driving rotational direction around the rotational center axis.

With the hub assembly according to the fifteenth aspect, the sprocket support structure functions as freewheel to allow the sprocket support structure to stop rotating during coasting.

In accordance with a sixteenth aspect of the present disclosure, the hub assembly according to the fifteenth aspect further comprises a detected part coupled to the sprocket support structure, and a rotation detection sensor being configured to detect the detected part to detect rotation of the sprocket support structure around the rotational center axis.

With the hub assembly according to the sixteenth aspect, it is possible to reliable detect rotation of the sprocket support structure.

In accordance with a seventeenth aspect of the present disclosure, the hub assembly according to the sixteenth aspect is configured so that the rotation detection sensor is disposed in the hub body.

With the hub assembly according to the seventeenth aspect, the rotation detection sensor is protected by the hub body.

Also, other objects, features, aspects and advantages of the disclosed hub assembly will become apparent to those skilled in the art from the following detailed description, which, taken in conjunction with the annexed drawings, discloses preferred embodiments of the disclosed hub assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
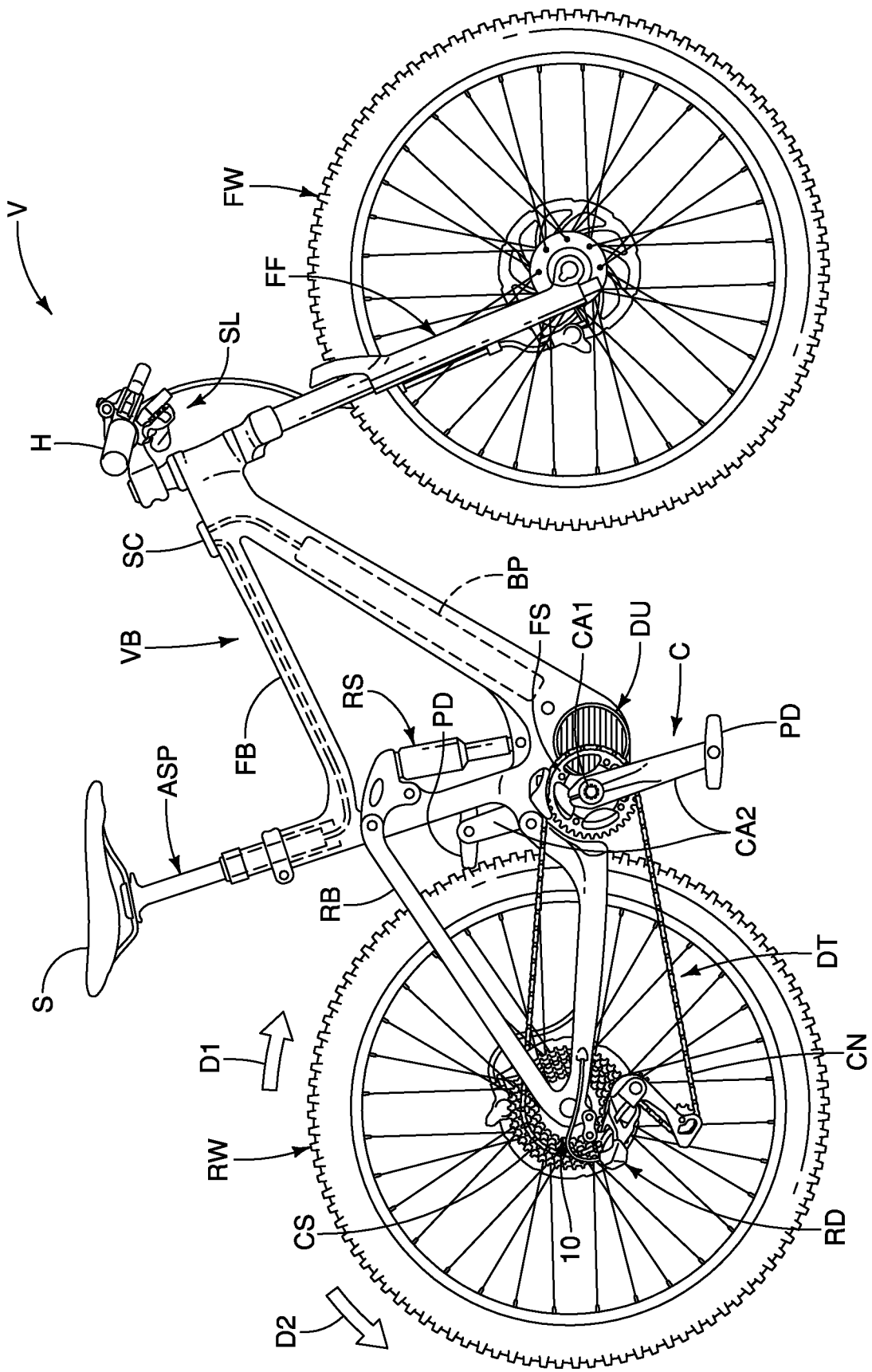
FIG. 1 is a side elevational view of a human-powered vehicle (i.e., bicycle) equipped with a hub assembly (i.e., a bicycle hub assembly) in accordance with a first embodiment.

Referring initially to FIG. 1, a hub assembly 10 is provided to a human-powered vehicle V. In other words, the human-powered vehicle V (i.e., a bicycle) is illustrated that is equipped with the hub assembly 10 in accordance with an illustrated embodiment. Here, in the illustrated embodiment, the hub assembly 10 is a bicycle hub. More specifically, the hub assembly 10 is a bicycle rear hub. Also, here, in the illustrated embodiment, the hub assembly 10 is a hub dynamo for providing electric power to one or more components of the bicycle V. However, the hub assembly 10 is not limited to a hub dynamo. In particular, certain aspects of the hub assembly 10 can be provided that does not generate electric power. Also, while the hub assembly 10 is illustrated as a rear hub, certain aspects of the hub assembly 10 can be provided to a front hub. Thus, the hub assembly 10 is not limited to a rear hub.

Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle. As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The bicycle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. The main battery pack BP can provide electrical power to other vehicle components such as the rear derailleur RD, the height adjustable seatpost ASP, the rear shock absorber RS, the front fork FF and any other vehicle component that uses electrical power.

The bicycle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the bicycle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the bicycle V.

Here, the bicycle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub assembly 10. The rear derailleur RD can be operated when a rider of the bicycle V manually operates a gear shift operating device or shifter SL. The rear derailleur RD can also be automatically operated based on traveling conditions and/or operating conditions of the bicycle V. The bicycle V can further include a plurality of electronic components. Some or all of the electronic components can be supplied with electric power generated by the hub assembly 10 during a power generation state as discussed herein.

The structure of the hub assembly 10 will now be described with particular reference to FIGS. 2 to 8. The hub assembly 10 comprises a hub axle 12. The hub assembly 10 further comprises a hub body 14. The hub axle 12 is configured to be non-rotatably attached to the vehicle body VB. In this embodiment, the hub axle 12 is configured to be non-rotatably attached to the rear frame body RB. The hub body 14 is rotatably mounted on the hub axle 12 to rotate around a rotational center axis A1 of the hub assembly 10. The hub axle 12 has a center axis coaxial with the rotational center axis A1. The hub body 14 is rotatably disposed around the rotational center axis A1. In other words, the hub body 14 is rotatably mounted around the hub axle 12.

Figure 2:
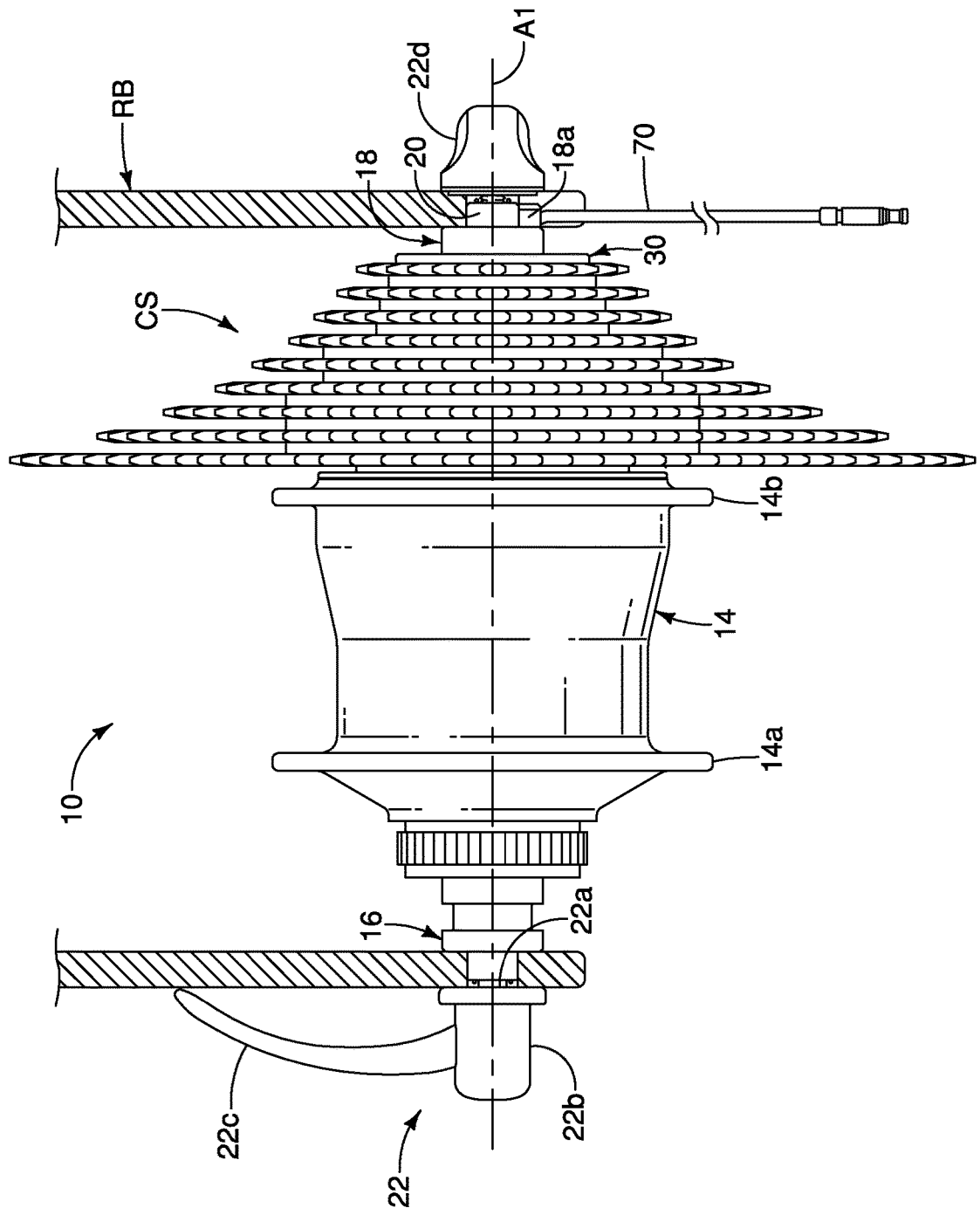
FIG. 2 is a longitudinal elevational view of the hub assembly attached to the vehicle body of the human-powered vehicle illustrated in FIG. 1.
Figure 4:
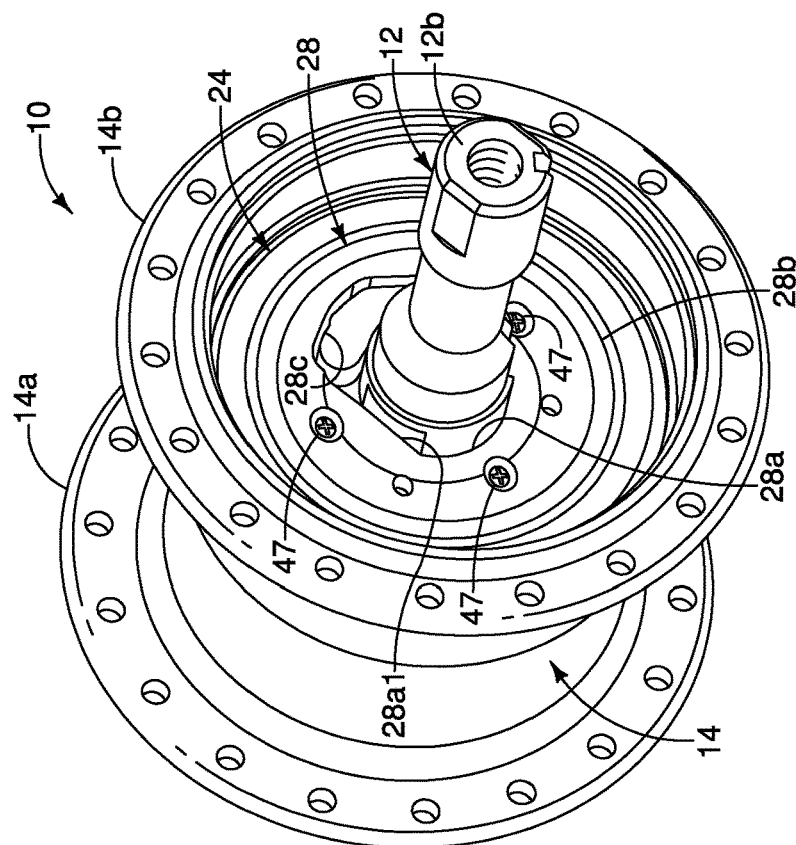
FIG. 4 is a perspective view of the hub assembly illustrated in FIGS. 2 and 3 but in which selective part have been removed to show the bearing spacer.
Figure 5:
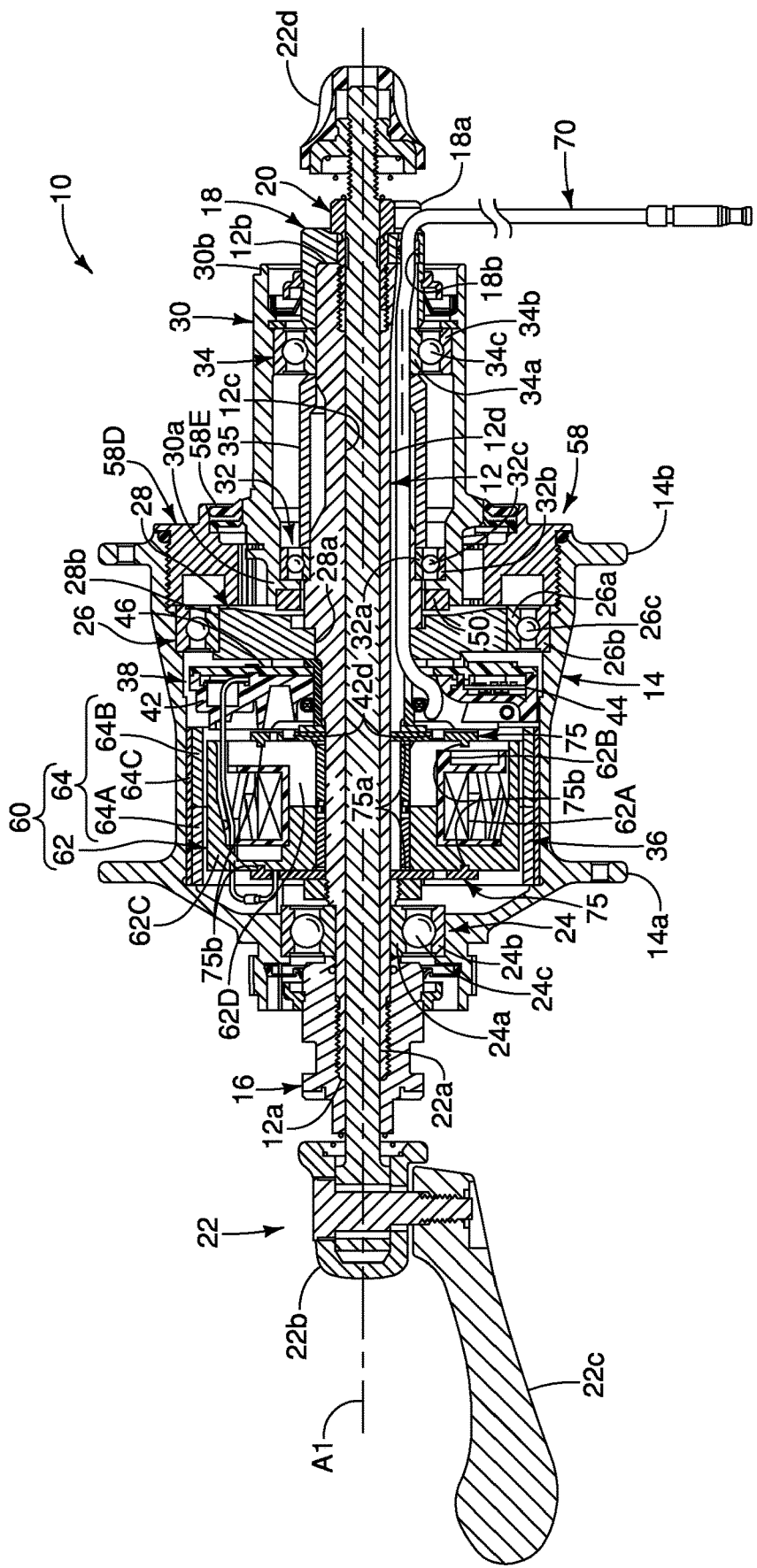
FIG. 5 is a longitudinal cross-sectional view of the hub assembly illustrated in FIGS. 2 to 4 as seen along section line 5-5 in FIG. 3.
Figure 6:
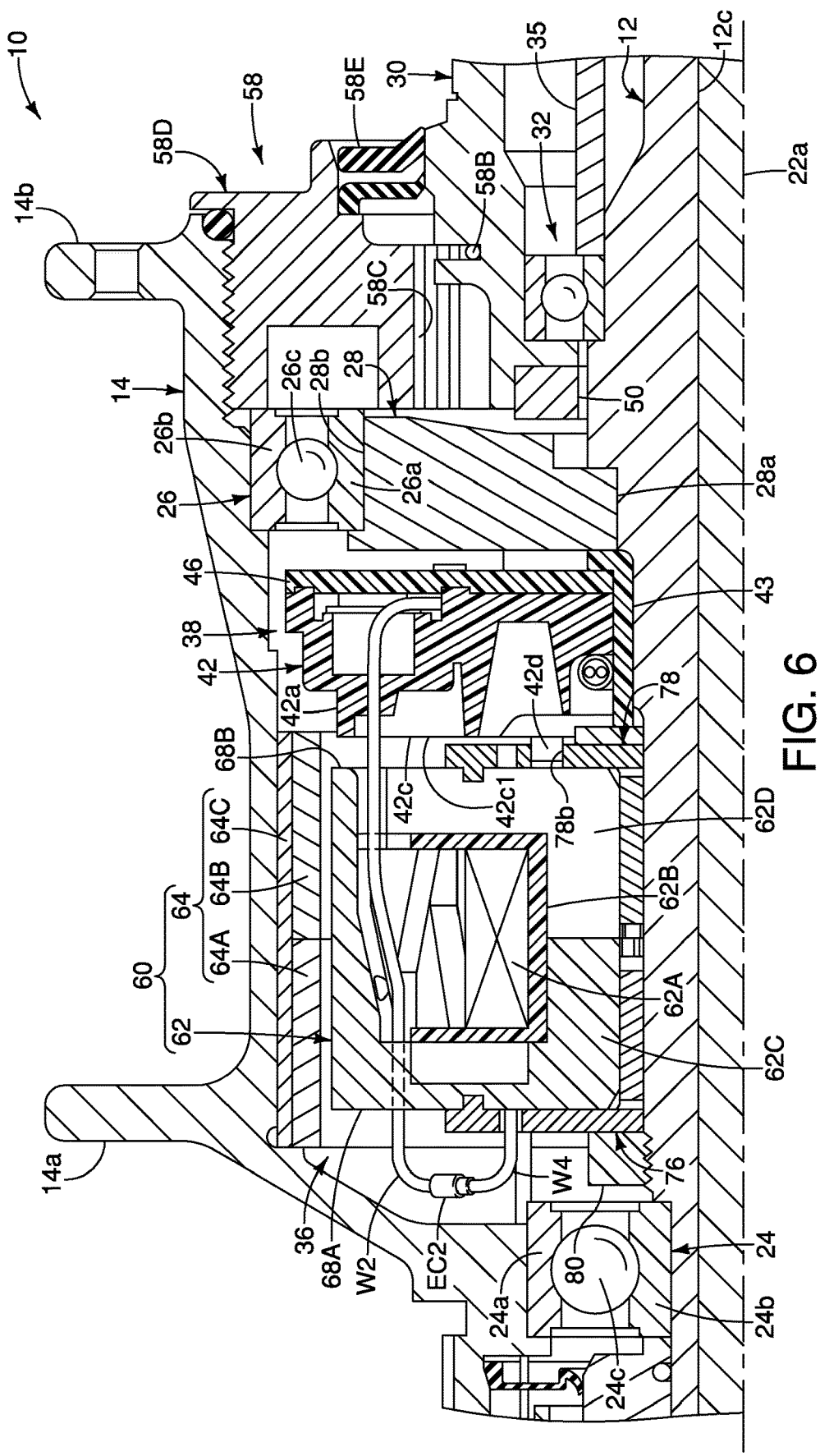
FIG. 6 is an enlarged cross-sectional view of a first portion of the hub assembly illustrated in FIG. 5.
Figure 7:
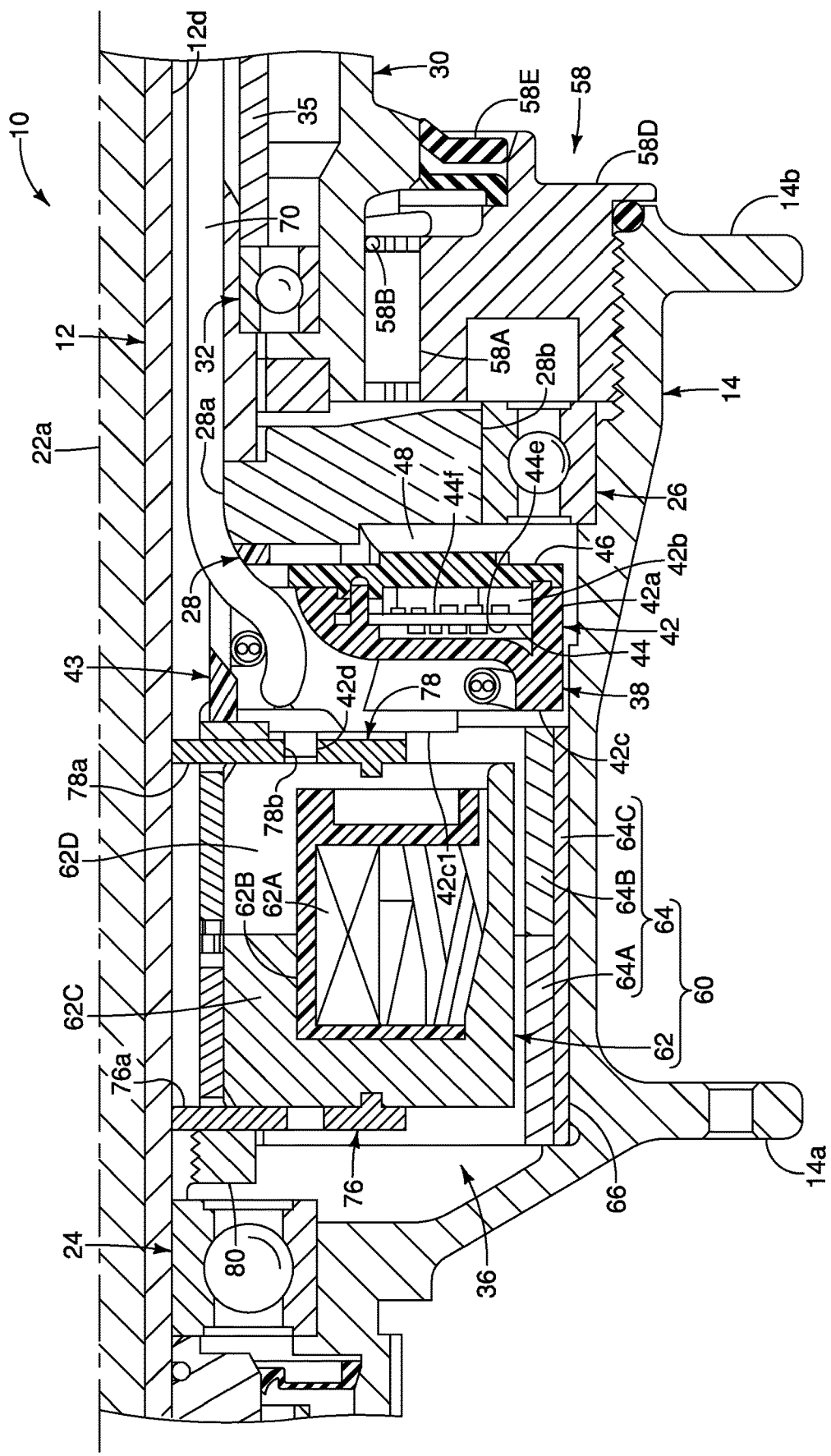
FIG. 7 is an enlarged cross-sectional view of a second portion of the hub assembly illustrated in FIG. 5.

As seen in FIGS. 5 to 7, the hub axle 12 is a rigid member made of a suitable material such as a metallic material. The hub axle 12 has a first axial end 12*a* and a second axial end 12*b*. Here, the hub axle 12 is a tubular member. Thus, the hub axle 12 has an axial bore 12*c* that extends between the first axial end 12*a* and the second axial end 12*b*. The hub axle 12 can be a one-piece member or made of several pieces. Here, the hub axle 12 is provided with a first end piece or end cap 16 and a second end piece or end cap 18. The first end cap 16 is mounted to the first axial end 12*a* (left side in FIGS. 2 to 8) of the hub axle 12, and the second end cap 18 is mounted to the second axial end 12*b* (right side in FIGS. 2 to 8) of the hub axle 12. For example, the first end cap 16 is threaded on the first axial end 12*a* of the hub axle 12, and the second end cap 18 is secured to the second axial end 12*b* of the hub axle 12 by a fixing bolt 20 that is threaded into the axial bore 12*c* of the hub axle 12. In this way, the first end cap 16 and the fixing bolt 20 are received in mounting openings of the rear frame body RB as seen in FIG. 2. Here, the second end cap 18 includes a rotation restriction part 18a which is also received in one of the mounting openings of the rear frame body RB. The rotation restriction part 18a engages the rear frame body RB so that rotation of the hub axle 12 relative to the rear frame body RB is restricted.

Here, as seen in FIGS. 2 and 5, the hub assembly 10 further comprises a wheel holding mechanism 22 for securing the hub axle 12 of the hub assembly 10 to the rear frame body RB. The wheel holding mechanism 22 basically includes a shaft or skewer 22a, a cam body 22b, a cam lever 22c and an adjusting nut 22d. The cam lever 22c is attached to one end of the skewer 22a via the cam body 22b, while the adjusting nut 22d is threaded on the other end of the skewer 22a. The lever 22c is attached to the cam body 22b. The cam body 22b is coupled between the skewer 22a and the cam lever 22c to move the skewer 22a relative to the cam body 22b. Thus, the lever 22c is operated to move the skewer 22a in the axial direction of the rotational center axis A1 with respect to the cam body 22b to change the distance between the cam body 22b and the adjusting nut 22d. Preferably, a compression spring is provided at each end of the skewer 22a. Alternatively, the hub axle 12 can be non-rotatably attached to the rear frame body RB with other attachment structures as needed and/or desired.

Figure 3:
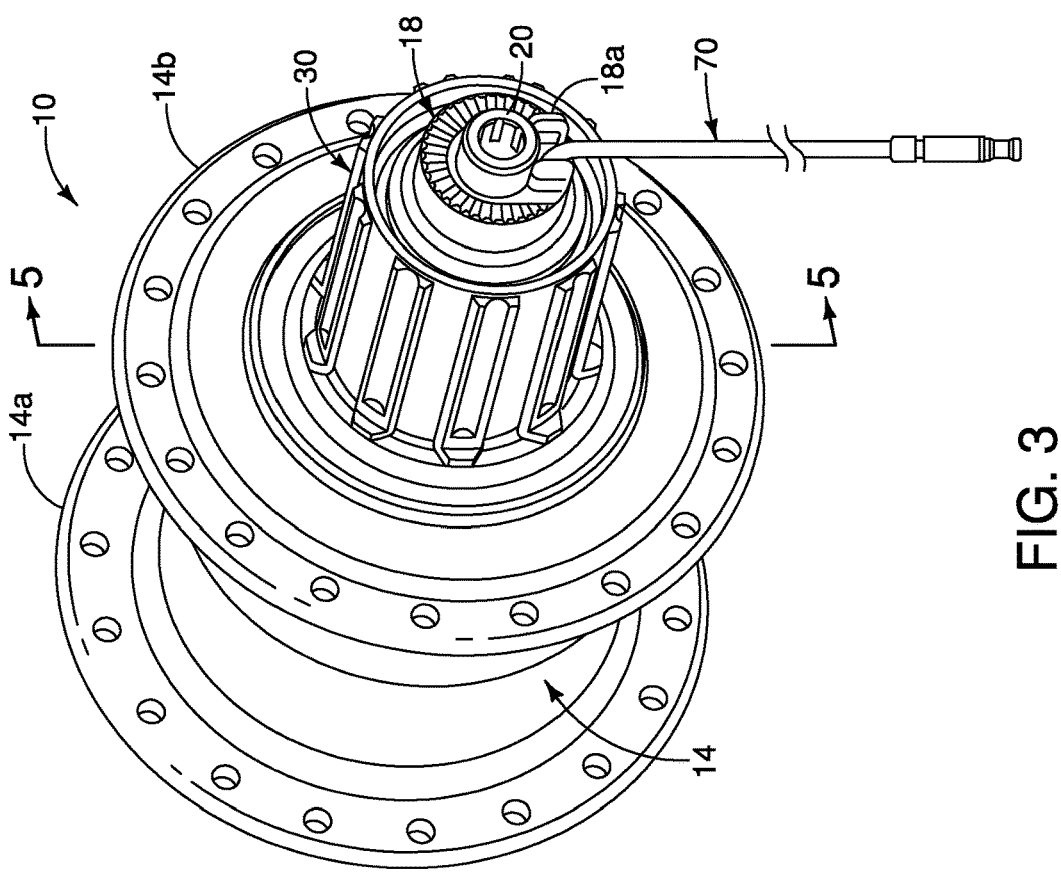
FIG. 3 is a perspective view of the hub assembly illustrated in FIG. 1.

As indicated in FIGS. 1, 3 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the rotational center axis A1 from a peripheral surface of the hub body 14. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

As seen FIGS. 5 and 6, the hub assembly 10 further comprises a first hub body bearing 24. The first hub body bearing 24 rotatably supports the hub body 14. Preferably, the hub assembly 10 further comprises a second hub body bearing 26 rotatably supporting an end of the hub body 14. The first hub body bearing 24 rotatably supports the other end of the hub body 14 with respect to the rotational center axis A1. The first hub body bearing 24 includes a first inner race 24a, a first outer race 24b and a plurality of first roller elements 24c. The first roller elements 24c are disposed between the first inner race 24a and the first outer race 24b. The second hub body bearing 26 includes a second inner race 26a, a second outer race 26b and a plurality of second roller elements 26c. The second roller elements 26c are disposed between the second inner race 26a and the second outer race 26b. The first hub body bearing 24 and the second hub body bearing 26 are radial ball bearings. Radial ball bearings support force in the direction perpendicular to the axis. Further, a radial roller bearing can be adopted instead of the radial ball bearing. Radial roller bearings include cylindrical roller bearings and needle roller bearings.

Here, the hub assembly 10 further comprises a bearing spacer 28. The bearing spacer 28 is provided on the hub axle 12 and supports the hub body 14 via the second hub body bearing 26. The bearing spacer 28 supports the second hub body bearing 26. The bearing spacer 28 has an inner peripheral end 28a provided to the hub axle 12 and an outer peripheral end 28b spaced radially outward of the inner peripheral end 28 in a radial direction with respect to the rotational center axis A1. The second hub body bearing 26 is disposed at the outer peripheral end 28b of the bearing spacer 28 and rotatably supports the hub body 14. The bearing spacer 28 is non-rotatable with respect to the hub axle 12. In particular, as seen in FIG. 4, the inner peripheral end 28a defines a non-circular opening 28a1 that mates with a non-circular portion of the hub axle 12 to non-rotatably couple the bearing spacer 28 with respect to the hub axle 12. The axial position of the bearing spacer 28 with respect to the hub axle 12 can be determined by being sandwiched between a step provided on the hub axle 12 and a nut screwed to the hub axle 12. Here, the bearing spacer 28 includes an axial opening 28c.

Here, the hub assembly 10 further comprises a sprocket support structure 30. In the illustrated embodiment, the sprocket support structure 30 supports the rear sprockets CS as seen in FIG. 2. The sprocket support structure 30 is rotatably disposed around the rotational center axis A1 to transmit a driving force to the hub body 14 while rotating in a driving rotational direction around the rotational center axis A1. As explained below, the sprocket support structure 30 does not transmit a driving force to the hub body 14 while rotating in a non-driving rotational direction D2 around the rotational center axis A1. The non-driving rotational direction D2 is opposite to the driving rotational direction D1 with respect to the rotational center axis A1. The rotational center axis of the sprocket support structure 30 is disposed concentrically with the rotational center axis A1 of the hub assembly 10.

While the sprocket support structure 30 is configured to non-rotatably support the rear sprockets CS, the sprocket support structure 30 is not limited to the illustrated embodiment. Alternatively, one or more of the rear sprockets CS can be integrally formed with the sprocket support structure 30. In any case, the sprocket support structure 30 and the rear sprockets CS are coupled together to rotate together in both the driving rotational direction D1 and the non-driving rotational direction D2.

The hub assembly 10 further comprises a first sprocket support bearing 32 and a second sprocket support bearing 34. The first sprocket support bearing 32 rotatably supports a first end 30a of the sprocket support structure 30. The second sprocket support bearing 34 rotatably supports a second end 30b of the sprocket support structure 30. The first sprocket support bearing 32 and the second sprocket support bearing 34 have outer diameters that are smaller than the outer peripheral end 28b of the bearing spacer 28. The inner diameter of the first sprocket support bearing 32 is larger than the inner diameter of the second sprocket support bearing 34. Thus, the first sprocket support bearing 32 and the second sprocket support bearing 34 can be mounted on the hub axle 12 from the second axial end 12b of the hub axle 12. The first sprocket support bearing 32 includes a first inner race 32a, a first outer race 32b and a plurality of first roller elements 32c. The first roller elements 32c are disposed between the first inner race 32a and the first outer race 32b. The second sprocket support bearing 34 includes a second inner race 34a, a second outer race 34b and a plurality of second roller elements 34c. The second roller elements 34c are disposed between the second inner race 34a and the second outer race 34b. Here, the first sprocket support bearing 32 and the second sprocket support bearing 34 are radial ball bearings. Radial ball bearings support force in the direction perpendicular to the axis. Further, a radial roller bearing can be adopted instead of the radial ball bearing. Radial roller bearings include cylindrical roller bearings and needle roller bearings. A tubular spacing element 35 is disposed between the first sprocket support bearing 32 and the second sprocket support bearing 34.

As seen in FIGS. 5 to 7, the hub assembly 10 further comprises an electrical assembly 36. Basically, as seen in FIGS. 9 and 11 to 14, the electrical assembly 36 comprises an electric component 38 and a first electrical cable 40. The first electrical cable 40 includes a pair of electrical wires W1 and W2. As a result, the hub assembly 10 further comprises the electrical component 38. While the electrical component 38 is part of the hub assembly 10, the electrical component 38 can be used with other components of the human-powered vehicle. Thus, the electrical component 38 is provided to the human-powered vehicle V.

Here, the hub assembly 10 further comprises a housing 42 disposed in the hub body 14. The housing 42 is a part of the electrical component 38. In other words, the electrical component 38 comprises the housing 42. Here, the hub assembly 10 further comprises a spacer 43 that is provided between the hub axle 12 and the electric component 38 in a radial direction with respect to the rotational center axis A1. The spacer 43 is a tubular support having a cylindrical guide portion 43a and an annular abutment portion 43b.

Also, the hub assembly 10 further comprises an electric circuit board 44 that is disposed in the hub body 14. In particular, the electric circuit board 44 is disposed in the housing 42. Also, a lid 46 is attached to the housing 42 for enclosing the electric circuit board 44 in the housing 42. Here, the lid 46 is bonded to the housing 42 by adhesive or welding. However, the lid 46 can be attached to the housing 42 by threaded fastener, rivets, etc. Preferably, the housing 42 and the lid 46 are rigid members made from a suitable material. For example, the housing 42 and the lid 46 are made of a resin material. For example, the housing 42 and the lid 46 can each be injected molded members. In the illustrated embodiment, the bearing spacer 28 is fixedly attached to the housing 42 and the lid 46 by a plurality of threaded fasteners 47.

Figure 8:
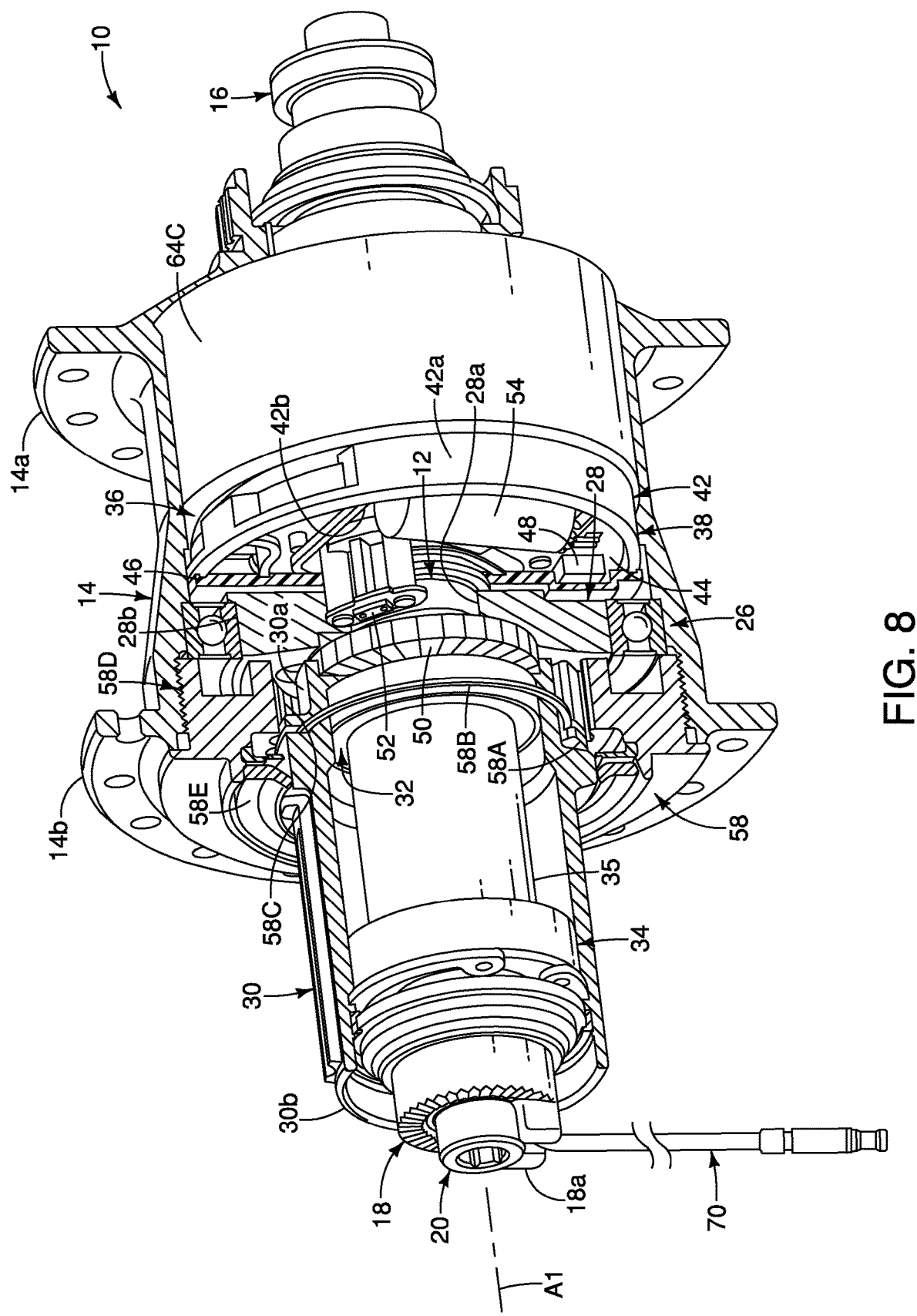
FIG. 8 is a perspective view of the hub assembly illustrated in FIGS. 2 to 5 with portions of the hub broken away.

The housing 42 is non-rotatable with respect to the hub axle 12. In the illustrated embodiment, the electric circuit board 44 is disposed in the housing 42, which is non-rotatable with respect to the hub axle 12. The housing 42 is configured to house the electric circuit board 44 as well as other items elements. In particular, the housing 42 has an outer peripheral surface 42a defining an internal space 42b in which the electric circuit board 44 is disposed. As seen in FIGS. 7 and 8, the lid 46 is coupled to the housing 42 to protect the electric circuit board 44 and other parts contained in the housing 42. The lid 46 overlies an internal space 42b of the housing 42. Thus, at least the housing 42, the electric circuit board 44, the capacitor 54 and the lid 46 can be considered to constitute an electrical unit that is disposed in the hub body 14. The internal space 42b has a donut shape in that the hub axle 12 passes through a center area of the housing 42. In this way, the electric circuit board 44 is non-rotatable with respect to the hub axle 12. The electric circuit board 44 is disposed perpendicular to the rotational center axis A1. The electric circuit board 44 is a part of the electrical component 38. The housing 42 includes an end wall portion 42c. The end wall portion 42c of the housing 42 includes a plurality of keying protrusions 42d. As described later, the keying protrusions 42d can be provided to engage a non-rotatable member that is provided to the hub axle 12 for non-rotatably coupling the housing 42 to the hub axle 12.

Figure 9:
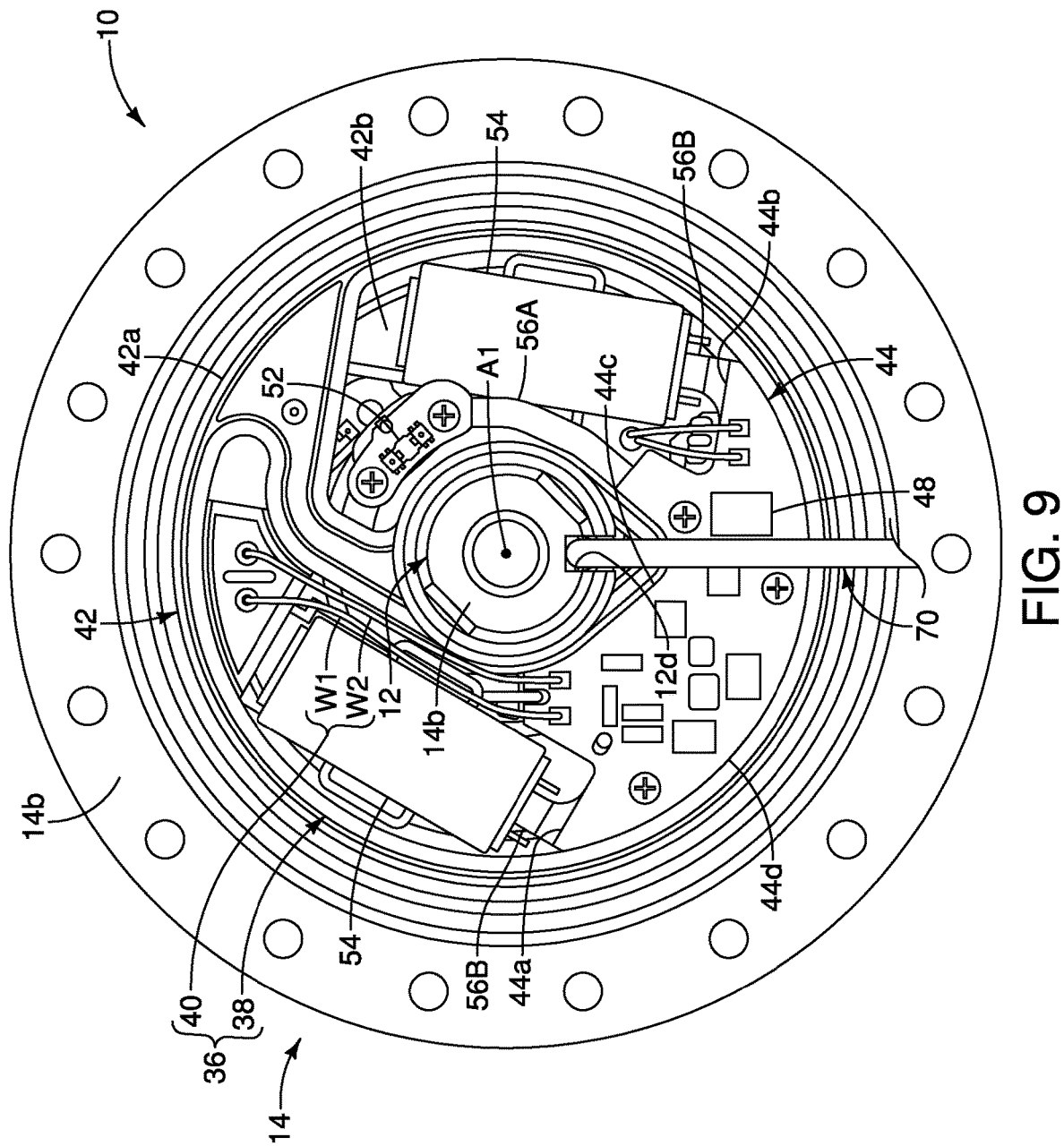
FIG. 9 is an end elevational view of the hub assembly illustrated in FIGS. 2 to 5 in which selected part.
Figure 10:
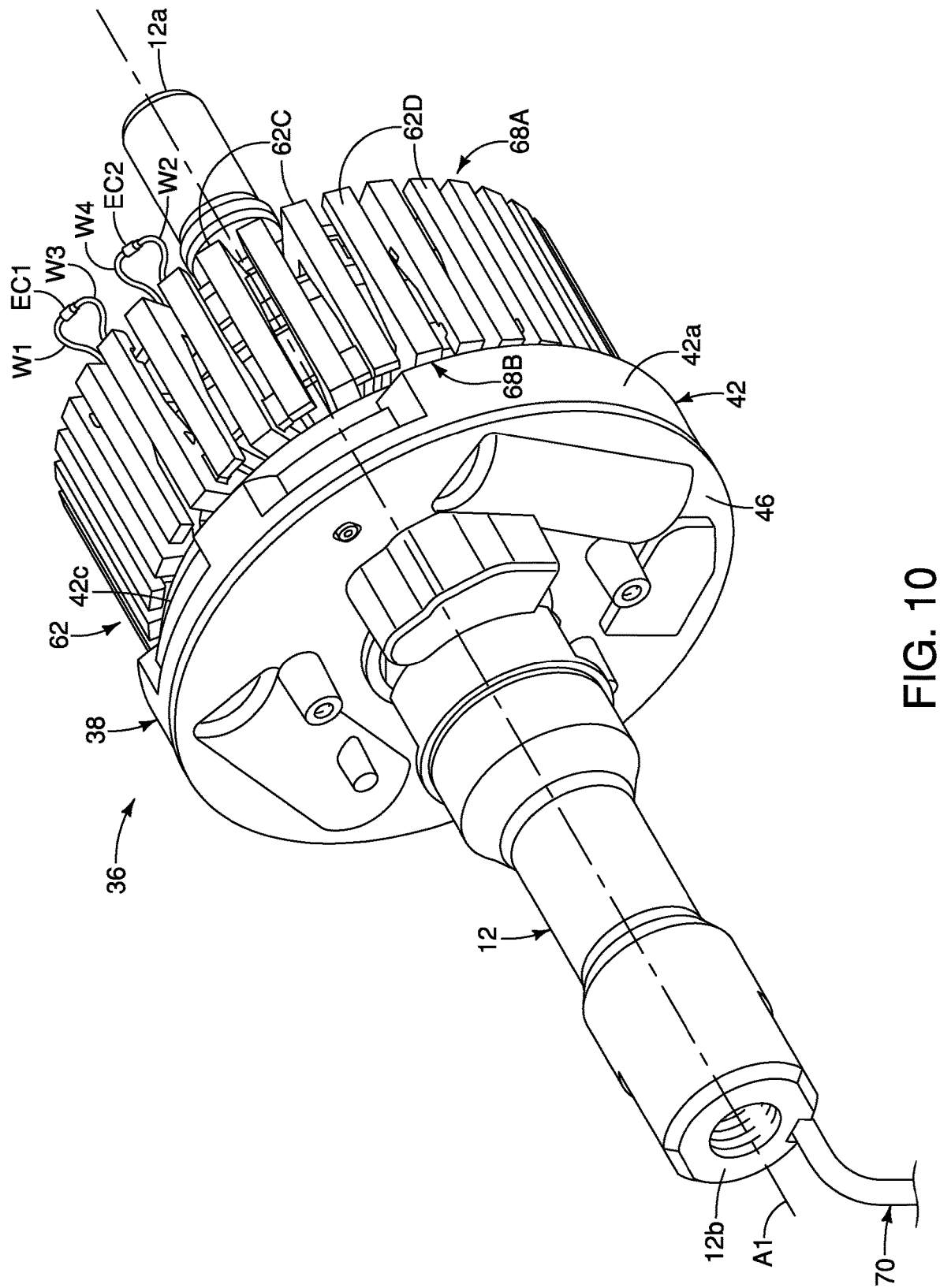
FIG. 10 is a first perspective view of the electrical assembly for the hub assembly illustrated in FIGS. 2 to 5.
Figure 11:
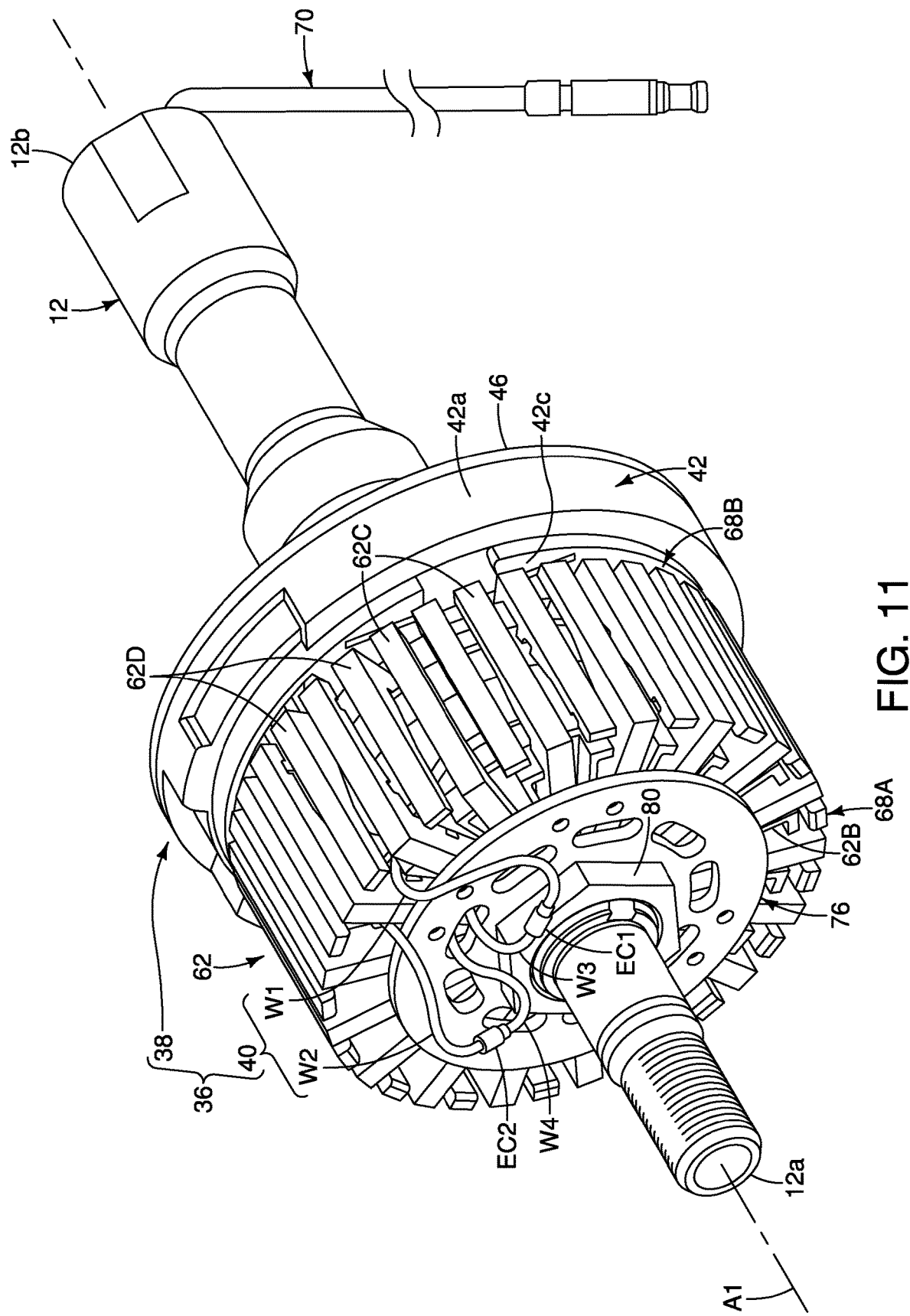
FIG. 11 is a second perspective view of the electrical assembly illustrated in FIG. 10.
Figure 12:
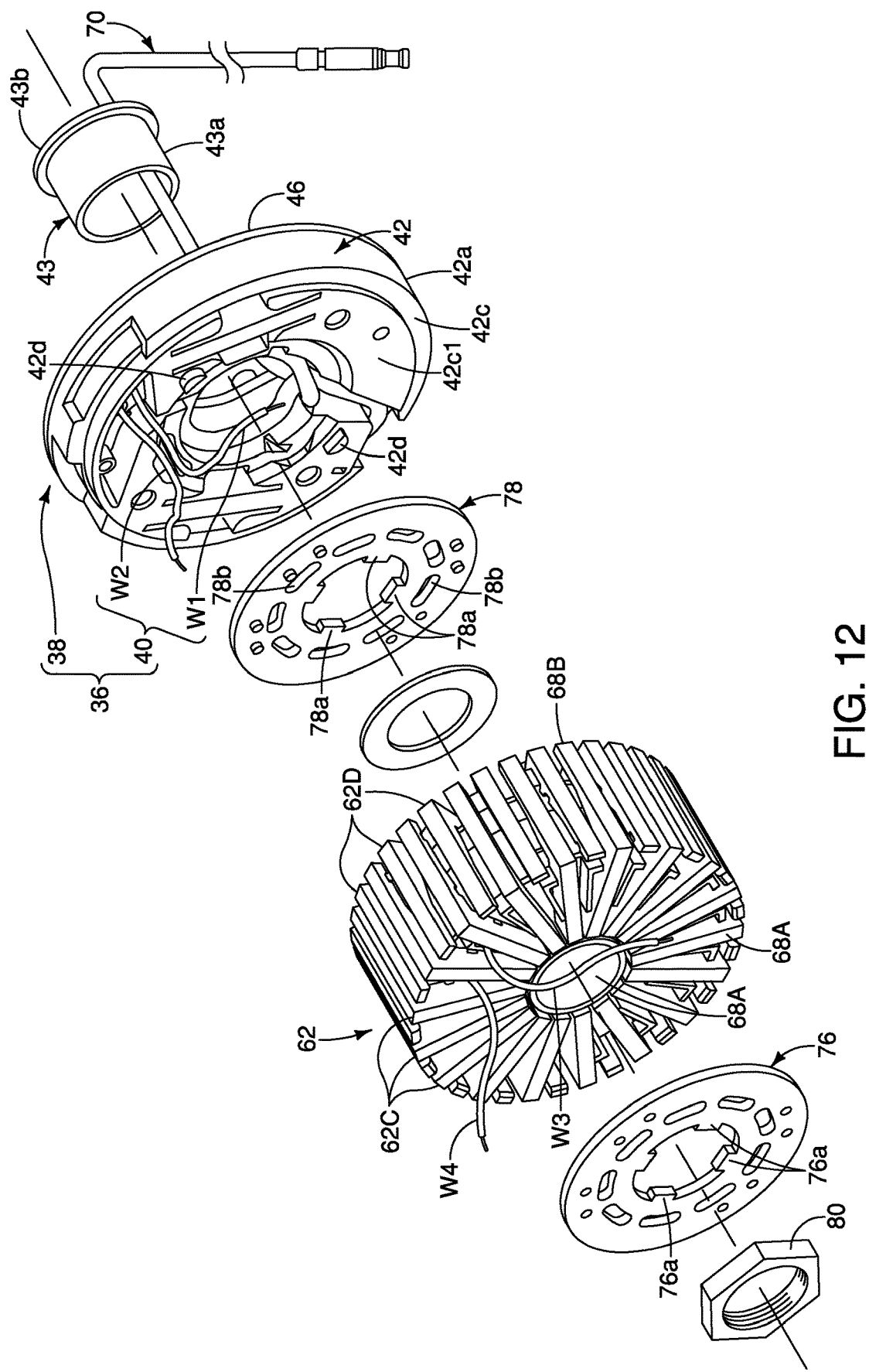
FIG. 12 is a partial exploded perspective view of the electrical assembly illustrated in FIGS. 10 and 11.
Figure 13:
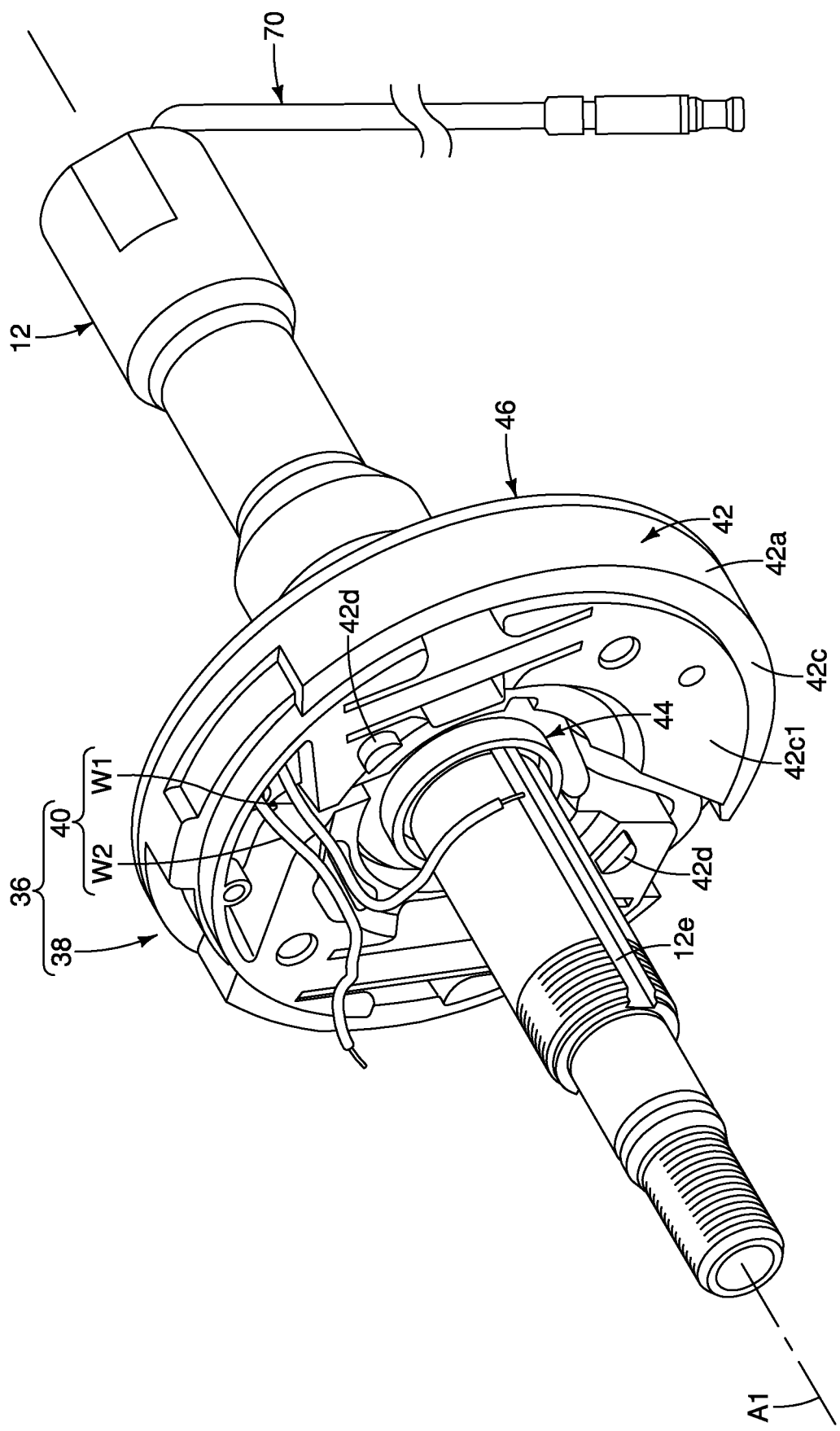
FIG. 13 is a perspective view of selected parts of the electrical assembly illustrated in FIGS. 10 and 11 in which the electric power generator has been removed.
Figure 15:
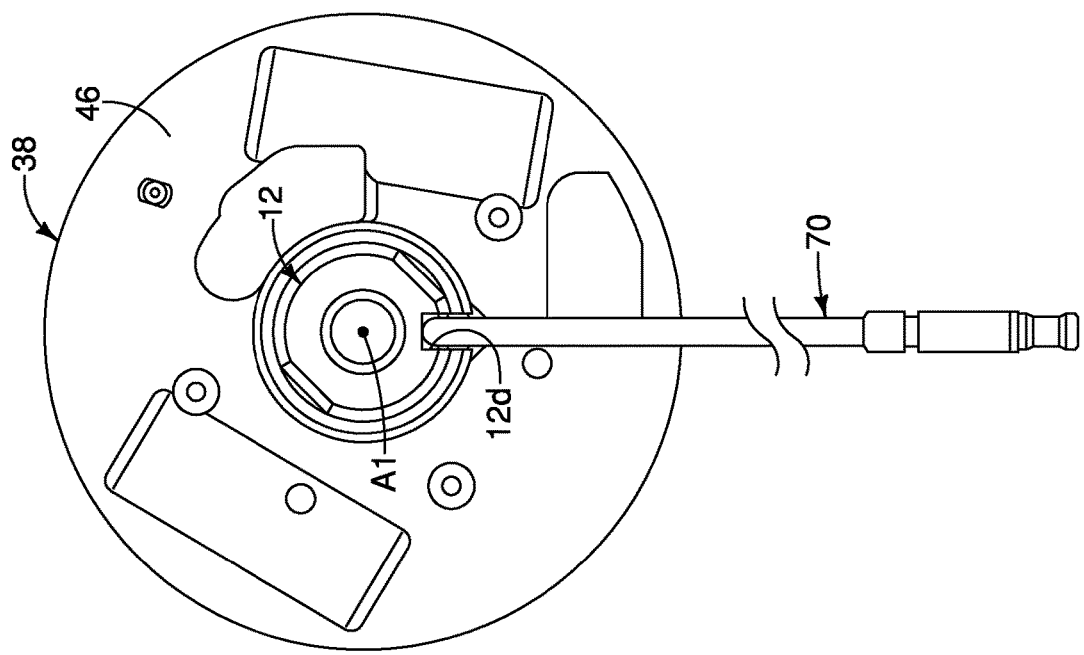
FIG. 15 is a first end elevational view of the selected parts of the electrical assembly illustrated in FIGS. 13 and 14.
Figure 14:
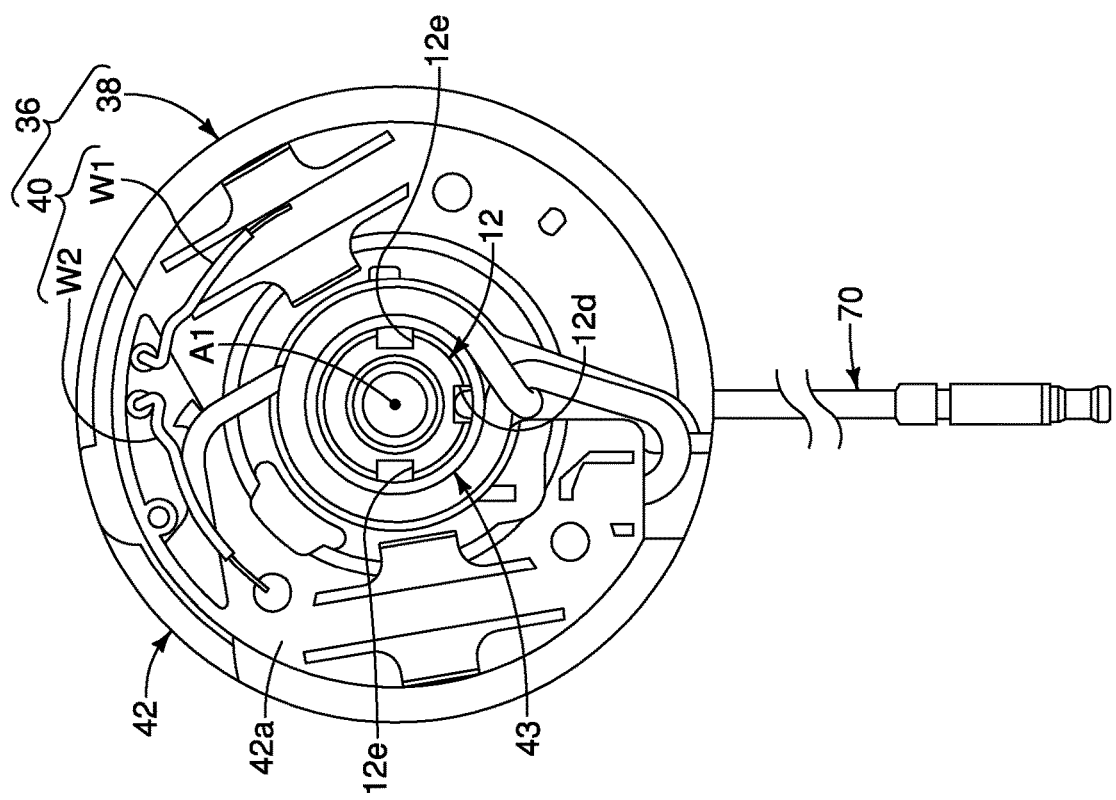
FIG. 14 is a first end elevational view of the selected parts of the electrical assembly illustrated in FIG. 13 in which the electric power generator has been removed.

As seen in FIG. 9, in the illustrated embodiment, the electric circuit board 44 has an arc shape. Here, the electric circuit board 44 has a first circumferential end portion 44a and a second circumferential end portion 44b. The electric circuit board 44 also has at least one arc shaped edge extending at least partly from the first circumferential end portion 44a to the second circumferential end portion 44b. Here, the at least one arc shaped edge includes at least one of an inner arc shaped edge 44c and an outer arc shaped edge 44d with respect to the rotational center axis A1. The electric circuit board 44 further includes an electronic controller 48 that provided on the electric circuit board 44. The electronic controller 48 is configured to receive a detection signal from the rotation detection sensor 52. The electronic controller 48 includes at least one processor that executes predetermined control programs. The at least one processor can be, for example, a central processing unit (CPU) or a micro processing unit (MPU). The term "electronic controller" as used herein refers to hardware that executes a software program, and does not include a human. Preferably, the electric circuit board 44 further includes a data storage device (memory) that provided on the electric circuit board 44. The data storage device (memory) stores various control programs and information used for various control processes including power generation control, power storage control, hub rotation detection control, etc. The data storage device includes any computer storage device or any non-transitory computer-readable medium with the sole exception of a transitory, propagating signal. For example, the data storage device includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

As seen in FIG. 8, the hub assembly 10 further comprises a detected part 50 coupled to the sprocket support structure 30. In particular, the detected part 50 is fixed to the sprocket support structure 30 so that the detected part 50 and the sprocket support structure 30 rotate together about the hub axle 12. The hub assembly 10 further comprises a rotation detection sensor 52 that is configured to detect the detected part 50 to detect rotation of the sprocket support structure 30 around the rotational center axis A1. The rotation detection sensor 52 is disposed in the hub body 14. In other words, the rotation detection sensor 52 is configured to detect the detected part 50 that is provided to the sprocket support structure 30. In particular, the rotation detection sensor 52 is provided in the internal space 42b of the housing 42. In this way, the rotation detection sensor 52 is non-rotatably mounted to the hub axle 12. Thus, the rotation detection sensor 52 does not rotate with the hub body 14. The rotation detection sensor 52 is also a part of the electrical component 38. The rotation detection sensor 52 is electrically connected to the electric circuit board 44. As seen in FIG. 7, the rotation detection sensor 52 is disposed in the hub body 14 at a location spaced radially outward from the hub axle 12.

Figure 16:
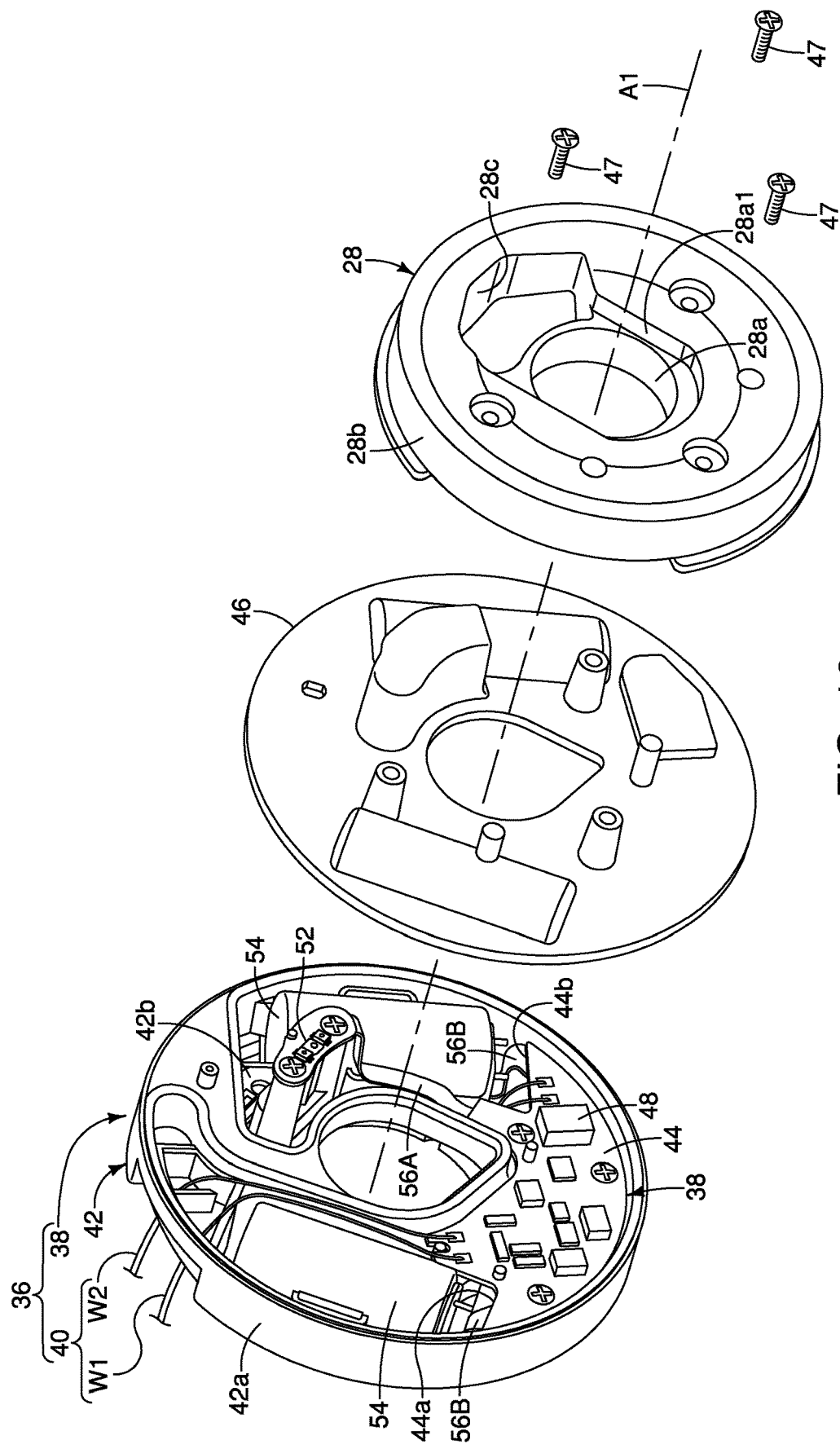
FIG. 16 is a partial exploded perspective view of the electrical component and the bearing spacer of the hub assembly illustrated in FIGS. 2 to 5.

As seen in FIGS. 4, 8 and 16, the rotation detection sensor 52 is disposed at a position that is axially aligned within the axial opening 28c of the bearing spacer 28. In this way, the bearing spacer 28 does not interfere with the rotation detection sensor 52 detecting the detected part 50 that is provided to the sprocket support structure 30. As seen in FIGS. 8 and 16, the rotation detection sensor 52 disposed at a position separated from the electric circuit board 44. In particular, the rotation detection sensor 52 is arranged at a position separated from the electric circuit board 44 in a direction parallel to the rotational center axis A1. The rotation detection sensor 52 is electrically connected to the electric circuit board 44.

In the illustrated embodiment, the rotation detection sensor 52 includes a magnetic sensor, and the detected part 50 includes a magnet. Thus, the magnetic sensor detects movement of the magnet, which rotates together with the sprocket support structure 30. In other words, with this arrangement, the rotation detection sensor 52 is configured to detect the detected part 50 to detect rotation of the sprocket support structure 30 around the rotational center axis A1. The electronic controller 48 is configured to receive a detection signal from the rotation detection sensor 52.

Here, the magnet of the detected part 50 is an annular member with alternating S-pole sections and N-pole sections. In this way, the rotation detection sensor 52 can detect a rotational amount and a rotational direction of the sprocket support structure 30. However, the detected part 50 is not limited to the illustrated annular member. For example, the detected part 50 can be formed of a single non-annular magnet, or two or more magnets that are circumferentially spaced apart about the rotational center axis A1. In the case of using two or more circumferentially spaced magnets, a back yoke can be provided and the circumferentially spaced magnets can be provided to the back yoke. In this way, the circumferentially spaced magnets can be easily installed in the hub 10. The term "sensor" as used herein refers to a hardware device or instrument designed to detect the presence or absence of a particular event, object, substance, or a change in its environment, and to emit a signal in response. The term "sensor" as used herein do not include a human.

Among other things, the electrical component 38 comprises the electric circuit board 44, at least one conductor and at least one capacitor. The hub assembly 10 further comprises at least one capacitor 54 electrically connected to the electric circuit board 44. The at least one capacitor is electrically connected to the at least one conductor. Here, the electrical component 38 comprises two capacitors 54. The capacitors 54 are examples of an electric power storage of the electrical component 38. In other words, the capacitor 54 is also a part of the electrical component 38. The capacitors 54 are preferably disposed in the housing 42 of the hub assembly 10. Thus, the capacitors 54 are non-rotatably supported on the hub axle 12 by the housing 42.

As explained below, an additional conductor electrically connecting the rotation detection sensor 52 and the electric circuit board 44. Also, here, the electrical component 38 comprises a first conductor 56A and a pair of second conductors 56B. The rotation detection sensor 52 is electrically connected to the electric circuit board 44 by the first conductor 56A. Here, the first conductor 56A is a flexible tape conductor. The first conductor 56A can be an electrically conductive lead. On the other hand, the electric circuit board 44 is electrically connected to the capacitors 54 by the second conductors 56B. The second conductors 56B extend from one of the first circumferential end portion 44a and the second circumferential end portion 44b. Here, one of the second conductors 56B extends from the first circumferential end portion 44a to electrical connect one of the capacitors 54 to the electric circuit board 44. The other one of the second conductors 56B extends from the second circumferential end portion 44b to electrical connect the other one of the capacitors 54 to the electric circuit board 44. Here, the second conductors 56B are flexible tape conductors. The second conductors 56B can be an electrically conductive lead. The capacitor 54 is provided in the internal space of the housing 42 at a position other than on the electronic circuit board 44. The capacitor 54 may be held in the housing 42 with an adhesive or the like. The lid 46 is coupled to the housing 42 to protect the capacitors 54.

The electric circuit board 44 is electrically connected to the rotation detection sensor 52 and the capacitor 54. In this way, the capacitor 54 provides electrical power to the electric circuit board 44 and other electrical components electrically connected to the electric circuit board 44. For example, the capacitor 54 provides electrical power to the rotation detection sensor 52. Also, the electronic controller 48 of the electric circuit board 44 is configured to control the input and output of electric power from the capacitor 54.

As seen in FIGS. 5 to 8, the hub assembly 10 further comprises a one-way clutch 58 that is formed between the hub body 14 and the sprocket support structure 30. The one-way clutch 58 includes a plurality of pawls 58A disposed between the hub body 14 and the sprocket support structure 30. The one-way clutch 58 further includes a biasing element 58B that couples the pawls 58A to the sprocket support structure 30. The one-way clutch 58 further includes a plurality of ratchet teeth 58C. The ratchet teeth 58C are provided to a fixing ring 58D that is fixed to the hub body 14. The ratchet teeth 58C are provided on the inner peripheral surface of the fixing ring 58D. The fixing ring 58D is screwed to the hub body 14. The fixing ring 58D is made of a hard material such as metal. The fixing ring 58D abuts against the outer race 26b of the second hub body bearing 26 in the axial direction with respect to the rotational center axis A1. The opposite side of the outer race 26b of the second hub body bearing 26 in the axial direction abuts against a step formed in the hub body 14. The outer race 26b of the second hub body bearing 26 is restricted in axial movement by the fixing ring 58D and the steps formed on the hub body 14. The biasing element 58B biases the pawls 58A into engagement with the ratchet teeth 58C of the fixing ring 58D. The biasing element 58B squeezes the pawls 54 against the sprocket support structure 30 such that the pawls 54 pivot towards engagement with the ratchet teeth 58C of the fixing ring 58D. A seal member 58E is provided on the fixing ring 58D. The seal member 58E is formed in a ring shape. The tongue portion of the sealing member 58E is in contact with the outer peripheral surface of the sprocket support 30.

In this way, the sprocket support structure 30 is coupled to the hub body 14 to rotate together in the driving rotational direction D1 around the rotational center axis A1. Also, in a case where the sprocket support structure 30 is rotated in the non-driving rotational direction D2, the ratchet teeth 58C of the sprocket support structure 18 push the pawls 58A and pivot the pawls 58A to a retracted position against the sprocket support structure 30. Thus, the sprocket support structure 30 is configured to rotate relative to the hub body 14 in the non-driving rotational direction D2 around the rotational center axis A1. In this way, the sprocket support structure 30 and the one-way clutch 58 form a freewheel that is commonly used in bicycles. Since the basic operation of the freewheel is relatively conventional, the freewheel will not be discussed or illustrated in further detail.

As seen in FIGS. 5 to 8 and 10 to 12, the hub assembly 10 comprises the electric power generator 60. Thus, the electric power generator 60 is provided to the human-powered vehicle V. Here, the electric power generator 60 is considered to be part of the electrical assembly 36. In other words, the electrical assembly 36 comprises the electric power generator 60. As explained below, the electrical component 38 and the first electrical cable 40 are considered to be parts of the electric power generator 60. Thus, the electrical component 38 and the first electrical cable 40 are also considered to be parts of the electrical assembly 36. Here, the first electrical cable 40 includes a pair of electrical wires W1 and W2. The electrical wires W1 and W2 are electrically connected to the electric circuit board 44. Here, the electrical wires W1 and W2 extend though openings in the end wall portion 42c of the housing 42, and then passes through the electric power generator 60 as explained below.

The electric power generator 60 is provided to the hub body 14, and is configured to generate electric power by rotation of the hub body 14. More specifically, the electric power generator 60 is provided to the hub body 14 between the hub axle 12 and a center portion of the hub body 14. In the illustrated embodiment, the hub body 14 is rotatably mounted on the axle 12 to rotate around the rotational center axis A1 of the electric power generator 60. The electric power generator 60 is configured to generate electric power by rotation of the hub body 14 relative to the hub axle 12. The electronic controller 48 of the electric circuit board 44 is electrically connected to the electric power generator 60 for controlling the electric power output of the electric power generator 60. Thus, the electric power generated by the electric power generator 60 can be stored and/or supplied directly to other components such as the rotation detection sensor 52, the rear derailleur RD, etc.

Although the electric power generator 60 is illustrated and described as part of the hub assembly 10, the electric power generator 60 can be applied to a different part of the human-powered vehicle V. In general, the electric power generator 60 comprises an axle, a stator, a rotor and a first electrical cable. Preferably, the electric power generator 60 further comprises an electric circuit board. More preferably, the electric power generator 60 further comprises a housing in which the electric circuit board is disposed. Thus, the following description of the electric power generator 60 is not limited to being used as part of the hub assembly. Rather, the following description of the electric power generator 60 can be adapted to other parts of the human-powered vehicle V for generating electricity.

In the illustrated embodiment, the electric power generator 60 further includes a stator 62 and a rotor 64. The stator 62 is non-rotatable with respect to the hub axle 12. On the other hand, the rotor 64 is rotatably mounted on the hub axle 12 to rotate around a rotational center axis A1 of the electric power generator 60. In particular, the rotor 64 is provided to the hub body 14 so as to rotate with the hub body 14. Thus, when the hub body 14 rotates with respect to the hub axle 12, the rotor 64 rotates with respect to the stator 62 for power generation. Namely, an induced electromotive force is generated on the stator 62 by the rotation of the rotor 64 and an electrical current flow out of the stator 62 of the electric power generator 60. The electrical current from the stator 62 is supplied to the electrical component 38 via the first electrical cable 40. In particular, as seen in FIG. 9, the first electrical cable 40 is electrically connected to the electric circuit board 44. More specifically, the stator 62 has a pair of electrical wires W3 and W4. The electrical wire W3 is electrically connected to the electrical wire W1 of the first electrical cable 40, and the electrical wire W4 is electrically connected to the electrical wire W2 of the first electrical cable 40.

Thus, in the illustrated embodiment, the electric power generator 60 comprises the hub axle 12, the stator 62, the rotor 64 and the first electrical cable 40. Also, in the illustrated embodiment, the electric power generator 60 further comprises the electrical component 38. Thus, in the illustrated embodiment, the electric power generator 60 further comprises the electric circuit board 44 and the housing 42 in which the electric circuit board 44 is disposed.

As seen in FIGS. 6, 7 and 10 and 11, the stator 62 has a first axial stator-end 68A that faces the first axial end 12a of the axle 12 with respect to the rotational center axis A1 and a second axial stator-end 68B that faces the second axial end 12b of the axle 12 with respect to the rotational center axis A1. Here, the stator 62 includes an armature that is disposed on the axle 12. The armature of the stator 62 includes a winding coil 62A and a bobbin 62B.

The winding coil 62A is wound on the bobbin 62B for supporting the winding coil 62A. The winding coil 62A is made of a conductive metal wire material, such as a copper wire or an aluminum alloy wire. The electrical wires W3 and W4 are electrically connected to both ends of the winding coil 62A. In this embodiment, the electrical wires W3 and W4 are both ends of the winding coil 62A. The electrical wire W3 is electrically connected to the electrical wire W1 of the first electrical cable 40 by a first electrical connector EC1. The electrical wire W4 is electrically connected to the electrical wire W2 of the first electrical cable 40 by a second electrical connector EC2. In this way, electric power generated in the winding coil 62A is transmitted to the electric circuit board 44 of the electrical component 38 via the first electrical cable 40. The electric circuit board 44 then regulates the electric power received from the winding coil 62A to selectively store the electric power in the capacitors 54 and/or to selectively transmit the electric power outside of the hub assembly 10 via the second electrical cable 70.

The bobbin 62B is non-rotatably coupled to the hub axle 12. The bobbin 62B has a cylindrical trunk portion, a first flange portion and a second flange portion. The cylindrical trunk portion has an outside circumference on which the winding coil 62A is wound. The first flange portion and the second flange portion are formed on both axial end portions of the cylindrical trunk portion.

In the illustrated embodiment, the housing 42 is disposed between the sprocket support structure 30 and the stator 62. The housing 42 has a first surface 42c1 facing the second axial stator-end 68B of the stator 62. The first surface 42c1 is formed by the exterior surface of the end wall portion 42c of the housing 42. Preferably, the housing 42 is disposed adjacent to the stator 62 at the second axial stator-end 68B of the stator 62 in the axial direction with respect to the rotational center axis A1. The first electrical cable 40 extends from the first surface 42c1 towards the stator 62.

Here, the electric circuit board 44 is disposed adjacent the stator 62 at the second axial stator-end 68B of the stator 62 in the axial direction with respect to the rotational center axis A1. The first electrical cable 40 is connected to the electric circuit board 44. In particular, the electric circuit board 44 has a first axially facing surface 44e facing the stator 62 and a second axially facing surface 44f facing away from the stator 62. Here, the first electrical cable 40 is electrically connected to the second axially facing surface 44f of the electric circuit board 44.

The armature of the stator 62 further includes a plurality of first yoke 62C and a plurality of second yoke 62D. The first yokes 62C are arranged in the circumferential direction of the hub axle 12. Likewise, the second yokes 62D are arranged in the circumferential direction of the hub axle 12 and alternate with the first yokes 62C. The winding coil 62A is located between the first yokes 62C and the second yokes 62D in the axial direction of the hub axle 12. Here, the first yokes 62C and the second yokes 62D are fitted to grooves of the bobbin 62B so that the first yokes 62C and the second yokes 62D alternate in a circumferential direction around the rotational center axis A1. The first yokes 62C and the second yokes 62D can be attached to the bobbin 62B by an adhesive, for example.

Each of the first yokes 62C can be a laminated yoke made up of a plurality of laminate pieces or can be a single piece. In the case of laminated yokes, the laminate pieces of the first yokes 62C are laminated together in the circumferential direction about the rotational center axis A1. The laminate pieces of the first yokes 62C are made of, for example, silicon steel sheets (more specifically, non-oriented silicon steel sheets) on the surface of which an oxide film has been formed. The laminate pieces of the first yokes 62C are examples of a plate-like member.

Likewise, the second yokes 62D can be a laminated yoke made up of a plurality of laminate pieces or can be a single piece. In the case of laminated yokes, the laminate pieces of the second yokes 62D are laminated together in the circumferential direction about the rotational center axis A1. The laminate pieces of the second yokes 62D are made of, for example, silicon steel sheets (more specifically, non-oriented silicon steel sheets) on the surface of which an oxide film has been formed. The laminate pieces of the second yokes 62D are examples of a plate-like member.

The rotor 64 includes at least one magnet. Here, in the illustrated embodiment, the rotor 64 includes a plurality of first magnet parts 64A and a plurality of second magnet parts 64B arranged inside a tubular support 64C. The tubular support 64C is fixedly coupled to the inside of the hub body 14 so that the magnet 64 and the hub body 14 rotate together around the hub axle 12. The tubular support 64C has the function of a back yoke. The back yoke is a member having a high magnetic permeability, which is arranged on the opposite side of the magnetized surface. By using the back yoke, a high generated magnetic field can be obtained. The tubular support 64C can be omitted. Alternatively, the hub body 14 can have the magnet 64 such that the hub body 14 partially forms the electric power generator 60. The first magnet parts 64A and the second magnet parts 64B are arranged so that S-poles and N-poles of the first magnet parts 64A and the second magnet parts 64B are alternately arranged in the circumferential direction of the hub axle 12. Therefore, the S-poles of the first magnet parts 64A are not aligned with the S-poles of the second magnet parts 64B, and the N-poles of the first magnet parts 64A are not aligned with the N-poles of the second magnet parts 64B in the axial direction of the hub axle 12.

As mentioned above, the winding coil 62A is illustrated as being fixed with respect to the hub axle 12, and the magnet 64 is illustrated as being fixed with respect to the hub body 14. Alternatively, the winding coil 62A can be fixed with respect to the hub body 14 and the magnet 64 can be fixed with respect to the hub axle 12.

As seen in FIGS. 6 and 10 to 12, the first electrical cable 40 is electrically connected to the stator 62 on the first axial stator-end 68A of the stator 62. The first electrical cable 40 extends axially through the stator 62 toward the second axial stator-end 68B of the stator 62 with respect to the rotational center axis A1. In particular, the first electrical cable 40 extends axially through the armature of the stator 62. More specifically, the electrical wires W1 and W2 of the first electrical cable 40 extends axially between the first yokes 62C and the second yokes 62D of the stator 62. The electrical wires W1 and W2 of the first electrical cable 40 extends axially between the first axial stator-end 68A and the second axial stator-end 68B of the stator 62. Thus, the first electrical cable 40 extends axially through the armature 62 at a point that is radially outward of the winding coil 62A.

The first electrical cable 40 extends axially through the armature 62 at a point that is radially outward of the bobbin 62B.

Also, the hub assembly 10 further comprises a second electrical cable 70. The second electrical cable 70 is electrically connected to the electric circuit board 44 and extends out from the hub body 14. Thus, the second electrical cable 70 is electrically connected the electric power generator 60 via the electric circuit board 44. The other end of the second electrical cable 70 is electrically connected to another electrical component of the human-powered vehicle V such as the rear derailleur RD, the battery pack BP or an electrical junction. In this way, the second electrical cable 70 can provide electric power generated by the hub assembly 10 to the rear derailleur RD, the battery pack BP or another electrical component. The second electrical cable 70 can also be used to transmit signals from the electronic controller 48 of the electric circuit board 44 to the rear derailleur RD or another electrical component using power line communication (PLC).

The second electrical cable 70 enters the hub assembly 10 thorough an opening 18b of the end cap 18. Then, the second electrical cable 70 extends axially along the hub axle 12 and passes through the bearing spacer 28. The second electrical cable 70 enters the housing 42 of the electrical component 38 through the lid 46. Inside the housing 42 of the electrical component 38, the second electrical cable 70 is electrically connected to the electric circuit board 44. Preferably, as in the illustrated embodiment, the second electrical cable 70 is disposed in an axially extending recess or groove 12d of the hub axle 12. The axially extending recess or groove 12d at least extends from the second axial end 12b to inside the housing 42 of the electrical component 38. Here, the groove 12d extends from the second axial end 12b past the electric power generator 60.

The hub assembly 10 further includes two fixing plates 76 and 78 that are provided on the hub axle 12 for non-rotatably coupling the stator 62 of the electric power generator 60 to the hub axle 12. The fixing plates 76 and 78 are provided on opposite axial ends of the electric power generator 60. The fixing plates 76 and 78 have a plate shape. The fixing plate 76 includes a plurality of protrusions 76a, and the fixing plate 78 includes a plurality of protrusion 78a. One of the protrusions 76a of the fixing plate 76 is disposed in the groove 12d of the hub axle 12. Likewise, one of the protrusions 78a of the fixing plate 78 is disposed in the groove 12d of the hub axle 12. The other ones of the protrusions 76a and 78a are disposed in two other axially extending grooves 12e of the hub axle 12. By inserting the protrusions 76a and 78a into these grooves 12d and 12e of the hub axle 12, the fixing plates 76 and 78 do not rotate with respect to the hub axle 12. The stator 62 of the electric power generator 60 does not rotate with respect to the hub axle 12 by the stator 62 engaging with protrusions protruding from an axially facing surface of the fixing plate plates 76 and 78. The fixing plates 76 and 78 are arranged so as to sandwich the stator 62 of the electric power generator 60 from both sides in the axial direction of the stator 62 of the electric power generator 60. Alternatively, the rotation of the fixed plates 76 and 78 with respect to the hub axle 12 can also suppressed by providing D-shaped cutouts that matches a corresponding outer surface of the hub axle 12. Optionally, one of the pair of fixing plates 76 and 78 can be omitted.

Also, the housing 42 can be non-rotatably coupled to one of the fixing plate 78 for suppressing rotation of the housing 42 with respect to the hub axle 12. For example, the keying protrusions 42d of the housing 42 are configured to engage openings 78b of the fixing plate 78 that is keyed to the groove 12d of the hub axle 12. The fixing plate 78 includes a plurality of openings 78b corresponding to the keying protrusions 42d. In this way, the housing 42 is prevented from rotating relative to the hub axle 12. Alternatively, the housing 42 can be attached to the bearing spacer 28, which is non-rotatably coupled to the hub axle 12. A nut 80 is threaded on the hub axle 12 for retaining the stator 64 and the housing 42 on the hub axle 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub assembly. Accordingly, these directional terms, as utilized to describe the hub should be interpreted relative to a human-powered vehicle (e.g., bicycle) in an upright riding position on a horizontal surface and that is equipped with the hub assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric power generator for a human-powered vehicle, the electric power generator comprising:
    an axle having a first axial end and a second axial end that are spaced apart from each other along an axial direction of the axle;
    a stator having a first axial stator-end and a second axial stator-end that are spaced apart from each other along the axial direction, the first axial stator-end facing the first axial end of the axle along the axial direction and the second axial stator-end facing the second axial end of the axle along the axial direction;
    a rotor rotatably mounted on the axle to rotate around a rotational center axis of the electric power generator, the rotational center axis extending parallel to the axial direction; and
    a first electrical cable electrically connected to the stator on the first axial stator-end of the stator, the first electrical cable being arranged to extend along the axial direction through the stator toward the second axial stator-end of the stator.

2. The electric power generator according to claim 1, wherein
    the rotor includes at least one magnet.

3. The electric power generator according to claim 1, wherein
    the stator includes an armature disposed on the axle, and
    the first electrical cable extends axially through the armature.

4. The electric power generator according to claim 3, wherein
    the armature includes a winding coil and a bobbin, and
    the first electrical cable extends axially through the armature at a point that is radially outward of the winding coil.

5. The electric power generator according to claim 1, further comprising
an electric circuit board, wherein
the first electrical cable is electrically connected to the electric circuit board.

6. The electric power generator according to claim 5, wherein
the electric circuit board is disposed adjacent the stator at the second axial stator-end of the stator in the axial direction.

7. The electric power generator according to claim 5, wherein
the electric circuit board is disposed perpendicular to the rotational center axis, the electric circuit board has a first axially facing surface facing the stator and a second axially facing surface facing away from the stator.

8. The electric power generator according to claim 7, wherein
the first electrical cable is electrically connected to the second axially facing surface of the electric circuit board.

9. The electric power generator according to claim 5, further comprising
a housing in which the electric circuit board is disposed.

10. The electric power generator according to claim 9, wherein
the housing is disposed adjacent to the stator at the second axial stator-end of the stator in the axial direction.

11. The electric power generator according to claim 9, wherein
the housing has a first surface facing the second axial stator-end of the stator, and
the first electrical cable extends from the first surface towards the stator.

12. A hub assembly comprising the electric power generator according to claim 5, and further comprising
a huh body rotatably mounted on the axle to rotate around a rotational center axis of the electric power generator.

13. The hub assembly according to claim 12, further comprising
a second electrical cable electrically connected to the electric circuit board and extending out from the hub body.

14. The hub assembly according to claim 12, further comprising
at least one capacitor electrically connected to the electric circuit board.

15. The hub assembly according to claim 12, further comprising
a sprocket support structure rotatably disposed around the rotational center axis to transmit a driving force to the hub body while rotating in a driving rotational direction around the rotational center axis.

16. The hub assembly according to claim 15, further comprising
a detected part coupled to the sprocket support structure, and
a rotation detection sensor being configured to detect the detected part to detect rotation of the sprocket support structure around the rotational center axis.

17. The hub assembly according to claim 16, wherein
the rotation detection sensor is disposed in the huh body.

18. The electric power generator according to claim 1, wherein
the rotor is disposed radially outward with respect to the stator.

19. The electric power generator according to claim 1, wherein
the stator includes a winding coil, and
at least a portion of the first electrical cable is disposed radially outward of the winding coil between the rotor and the winding coil.

20. The electric power generator according to claim 1, wherein
the first electrical cable is arranged to
protrude from the first axial stator-end of the stator toward the first axial end of the axle at a first position, and
be electrically connected to the stator at a second position different from the first position.

* * * * *